United States Patent
Khoshnevisan et al.

(10) Patent No.: US 11,038,727 B2
(45) Date of Patent: Jun. 15, 2021

(54) USER EQUIPMENT RECEIVER PROCESSING FOR MULTI-TRANSMIT-RECEIVE-POINT COMMUNICATION

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US); Farhad Meshkati, San Diego, CA (US); Rajat Prakash, San Diego, CA (US); Yongbin Wei, La Jolla, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/664,178

(22) Filed: Oct. 25, 2019

(65) Prior Publication Data

US 2020/0153666 A1  May 14, 2020

Related U.S. Application Data

(60) Provisional application No. 62/757,293, filed on Nov. 8, 2018.

(51) Int. Cl.
*H04L 27/00* (2006.01)
*H04L 25/02* (2006.01)
*H04L 1/00* (2006.01)

(52) U.S. Cl.
CPC ........ *H04L 27/0014* (2013.01); *H04L 1/0015* (2013.01); *H04L 25/0204* (2013.01);
(Continued)

(58) Field of Classification Search
None
See application file for complete search history.

(56) References Cited

U.S. PATENT DOCUMENTS 6,014,405 A * 1/2000 Garodnick ........... H04B 1/7093
                                                        375/148
6,081,228 A * 6/2000 Leimer .................. G01S 19/21
                                                        342/357.48
(Continued)

FOREIGN PATENT DOCUMENTS

WO    2018143846 A1    8/2018
WO    2019047945 A1    3/2019
WO    2019067925 A1    4/2019

OTHER PUBLICATIONS

International Search Report and Written Opinion—PCT/US2019/058345—ISA/EPO—dated Feb. 5, 2020.
(Continued)

*Primary Examiner* — Berhanu Tadese
(74) *Attorney, Agent, or Firm* — Harrity & Harrity, LLP

(57) ABSTRACT

Various aspects of the present disclosure generally relate to wireless communication. In some aspects, a user equipment (UE) may determine a first set of parameters based at least in part on a first reference signal received from a first transmit receive point (TRP) and a second set of parameters based at least in part on a second reference signal received from a second TRP; determine a common parameter using the first set of parameters and the second set of parameters; and perform a tracking loop operation using the common parameter or the first set of parameters and the second set of parameters, wherein the tracking loop operation comprises at least one of a frequency tracking loop operation or a time tracking loop operation. Numerous other aspects are provided.

28 Claims, 11 Drawing Sheets

(52) U.S. Cl.
CPC .. *H04L 25/0224* (2013.01); *H04L 2027/0026* (2013.01); *H04L 2027/0073* (2013.01)

(56) References Cited

U.S. PATENT DOCUMENTS

| | | | | |
|---|---|---|---|---|
| 6,128,557 | A * | 10/2000 | Fenton | G01S 19/24 701/13 |
| 6,268,824 | B1 * | 7/2001 | Zhodzishky | G01S 19/37 342/357.31 |
| 6,313,789 | B1 * | 11/2001 | Zhodzishsky | G01S 19/29 342/357.68 |
| 6,728,303 | B2 * | 4/2004 | Sendonaris | H04B 1/7117 375/148 |
| 9,869,770 | B2 * | 1/2018 | Chansarkar | H04B 1/707 |
| 10,231,235 | B2 * | 3/2019 | Yi | H04W 72/0446 |
| 10,554,262 | B2 * | 2/2020 | John Wilson | H04B 7/0408 |
| 10,567,065 | B2 * | 2/2020 | Kundargi | H04W 72/085 |
| 2004/0125862 | A1 * | 7/2004 | Li | H04B 17/318 375/147 |
| 2005/0041724 | A1 * | 2/2005 | Chansarkar | H03L 7/093 375/149 |
| 2006/0146954 | A1 * | 7/2006 | Markman | H04L 27/066 375/270 |
| 2008/0130815 | A1 * | 6/2008 | Kumar | H03C 5/00 375/373 |
| 2008/0267164 | A1 * | 10/2008 | D'Alessandro | H04B 1/7115 370/350 |
| 2009/0232257 | A1 * | 9/2009 | Bury | H04L 27/2657 375/341 |
| 2010/0067619 | A1 * | 3/2010 | Furman | H04L 27/0014 375/326 |
| 2010/0232488 | A1 * | 9/2010 | Song | H04B 17/21 375/224 |
| 2010/0260233 | A1 * | 10/2010 | Luong | H04L 27/266 375/136 |
| 2011/0009054 | A1 * | 1/2011 | Irvine | H04B 7/18513 455/9 |
| 2012/0314591 | A1 * | 12/2012 | Zhang | H04L 12/189 370/252 |
| 2013/0051322 | A1 * | 2/2013 | Barbieri | H04L 5/0053 370/328 |
| 2013/0176873 | A1 * | 7/2013 | Ji | H04W 76/28 370/252 |
| 2014/0086199 | A1 * | 3/2014 | Fertonani | H04W 56/0035 370/330 |
| 2015/0163825 | A1 * | 6/2015 | Sadek | H04W 74/0808 370/329 |
| 2015/0319718 | A1 * | 11/2015 | Yang | H04W 24/08 370/252 |
| 2015/0341877 | A1 * | 11/2015 | Yl | H04W 56/001 370/350 |
| 2016/0182270 | A1 * | 6/2016 | Jungnickel | H04L 27/2649 375/260 |
| 2016/0309466 | A1 * | 10/2016 | Chen | H04W 72/0446 |
| 2017/0070312 | A1 * | 3/2017 | Yl | H04J 11/0069 |
| 2017/0086172 | A1 * | 3/2017 | Dinan | H04W 72/0453 |
| 2017/0118001 | A1 * | 4/2017 | Yl | H04W 24/10 |
| 2017/0215186 | A1 * | 7/2017 | Chen | H04L 27/2602 |
| 2017/0261618 | A1 * | 9/2017 | Zhodzishsky | G01S 19/29 |
| 2017/0331577 | A1 * | 11/2017 | Parkvall | H04W 8/18 |
| 2017/0331670 | A1 * | 11/2017 | Parkvall | H04L 41/0233 |
| 2017/0339714 | A1 * | 11/2017 | Harada | H04L 5/0091 |
| 2018/0049236 | A1 * | 2/2018 | Sun | H04L 5/0048 |
| 2018/0199212 | A1 * | 7/2018 | Lin | H04B 7/005 |
| 2018/0254936 | A1 * | 9/2018 | Choi | H04L 27/264 |
| 2018/0270834 | A1 * | 9/2018 | Falconetti | H04W 72/082 |
| 2018/0331727 | A1 * | 11/2018 | John Wilson | H04L 5/0091 |
| 2019/0052344 | A1 * | 2/2019 | Kundargi | H04B 17/24 |
| 2019/0053072 | A1 * | 2/2019 | Kundargi | H04B 7/0814 |
| 2019/0132827 | A1 * | 5/2019 | Kundargi | H04B 7/088 |
| 2019/0132828 | A1 * | 5/2019 | Kundargi | H04B 7/088 |
| 2019/0141691 | A1 * | 5/2019 | Kwon | H04L 5/00 |
| 2019/0141692 | A1 * | 5/2019 | Subramanian | H04B 7/0695 |
| 2019/0141693 | A1 * | 5/2019 | Guo | H04L 5/0053 |
| 2019/0174466 | A1 * | 6/2019 | Zhang | H04W 72/042 |
| 2019/0239212 | A1 * | 8/2019 | Wang | H04L 5/0053 |
| 2019/0239245 | A1 * | 8/2019 | Davydov | H04W 16/28 |
| 2019/0273637 | A1 * | 9/2019 | Zhang | H04B 5/0031 |
| 2019/0327115 | A1 * | 10/2019 | Zhang | H04B 7/0617 |
| 2019/0387547 | A1 * | 12/2019 | Shin | H04W 74/0833 |
| 2020/0015200 | A1 * | 1/2020 | Vilaipornsawai | H04L 1/1819 |
| 2020/0100248 | A1 * | 3/2020 | Kim | H04W 72/0453 |
| 2020/0107341 | A1 * | 4/2020 | Zhang | H04W 72/042 |
| 2020/0112411 | A1 * | 4/2020 | Khoshnevisan | H04L 5/0051 |
| 2020/0136690 | A1 * | 4/2020 | Noh | H04L 5/0037 |
| 2020/0153666 | A1 * | 5/2020 | Khoshnevisan | H04L 1/0015 |
| 2020/0205116 | A1 * | 6/2020 | Zhang | H04L 1/203 |

OTHER PUBLICATIONS

Qualcomm Incorporated: "Discussion on QCL", 3GPP TSG RAN WG1 NR Ad-Hoc#2, R1-1711176, Jun. 27-30, 2017, 5 pages.

* cited by examiner

USER EQUIPMENT RECEIVER PROCESSING FOR MULTI-TRANSMIT-RECEIVE-POINT COMMUNICATION

CROSS-REFERENCE TO RELATED APPLICATION

This application claims priority to U.S. Provisional Patent Application No. 62/757,293, filed on Nov. 8, 2018, entitled "USER EQUIPMENT RECEIVER PROCESSING FOR MULTI-TRANSMIT-RECEIVE-POINT COMMUNICATION," which is hereby expressly incorporated by reference herein.

TECHNICAL FIELD

Aspects of the technology described below generally relate to wireless communication, and more particularly to techniques and apparatuses for user equipment receiver processing for multi-transmit-receive-point communication. Some techniques and apparatuses described herein enable and provide wireless communication devices and systems configured for low latency scenarios, high reliability scenarios, and/or enhanced network coverage.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). As demand for mobile broadband access continues to increase, there exists a need for further improvements in LTE and NR technologies. These improvements can apply to other multiple access technologies and the telecommunication standards that employ these technologies.

BRIEF SUMMARY OF SOME EXAMPLES

So that the above-recited features of the present disclosure can be understood in detail, a more particular description, briefly summarized above, may be had by reference to aspects, some of which are illustrated in the appended drawings. The appended drawings illustrate only certain aspects of this disclosure and are therefore not to be considered limiting of its scope. The same reference numbers in different drawings may identify the same or similar elements.

In some aspects, a method of wireless communication, performed by a user equipment (UE), may include determining a first set of parameters based at least in part on a first reference signal received from a first transmit receive point (TRP) and a second set of parameters based at least in part on a second reference signal received from a second TRP; determining a common parameter using the first set of parameters and the second set of parameters; and performing a tracking loop operation using the common parameter or the first set of parameters and the second set of parameters, wherein the tracking loop operation comprises at least one of a frequency tracking loop operation or a time tracking loop operation.

In some aspects, a UE for wireless communication may include memory and one or more processors operatively coupled to the memory. The memory and the one or more processors may be configured to determine a first set of parameters based at least in part on a first reference signal received from a first transmit receive point (TRP) and a second set of parameters based at least in part on a second reference signal received from a second TRP; determine a common parameter using the first set of parameters and the second set of parameters; and perform a tracking loop operation using the common parameter or the first set of parameters and the second set of parameters, wherein the tracking loop operation comprises at least one of a frequency tracking loop operation or a time tracking loop operation.

In some aspects, a non-transitory computer-readable medium may store one or more instructions for wireless communication. The one or more instructions, when executed by one or more processors of a UE, may cause the one or more processors to determine a first set of parameters based at least in part on a first reference signal received from a first transmit receive point (TRP) and a second set of parameters based at least in part on a second reference signal received from a second TRP; determine a common parameter using the first set of parameters and the second set of parameters; and perform a tracking loop operation using the common parameter or the first set of parameters and the second set of parameters, wherein the tracking loop operation comprises at least one of a frequency tracking loop operation or a time tracking loop operation.

In some aspects, an apparatus for wireless communication may include means for determining a first set of parameters based at least in part on a first reference signal received from a first transmit receive point (TRP) and a second set of parameters based at least in part on a second reference signal received from a second TRP; means for determining a common parameter using the first set of parameters and the second set of parameters; and means for performing a tracking loop operation using the common parameter or the first set of parameters and the second set of parameters, wherein the tracking loop operation comprises at least one of a frequency tracking loop operation or a time tracking loop operation.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
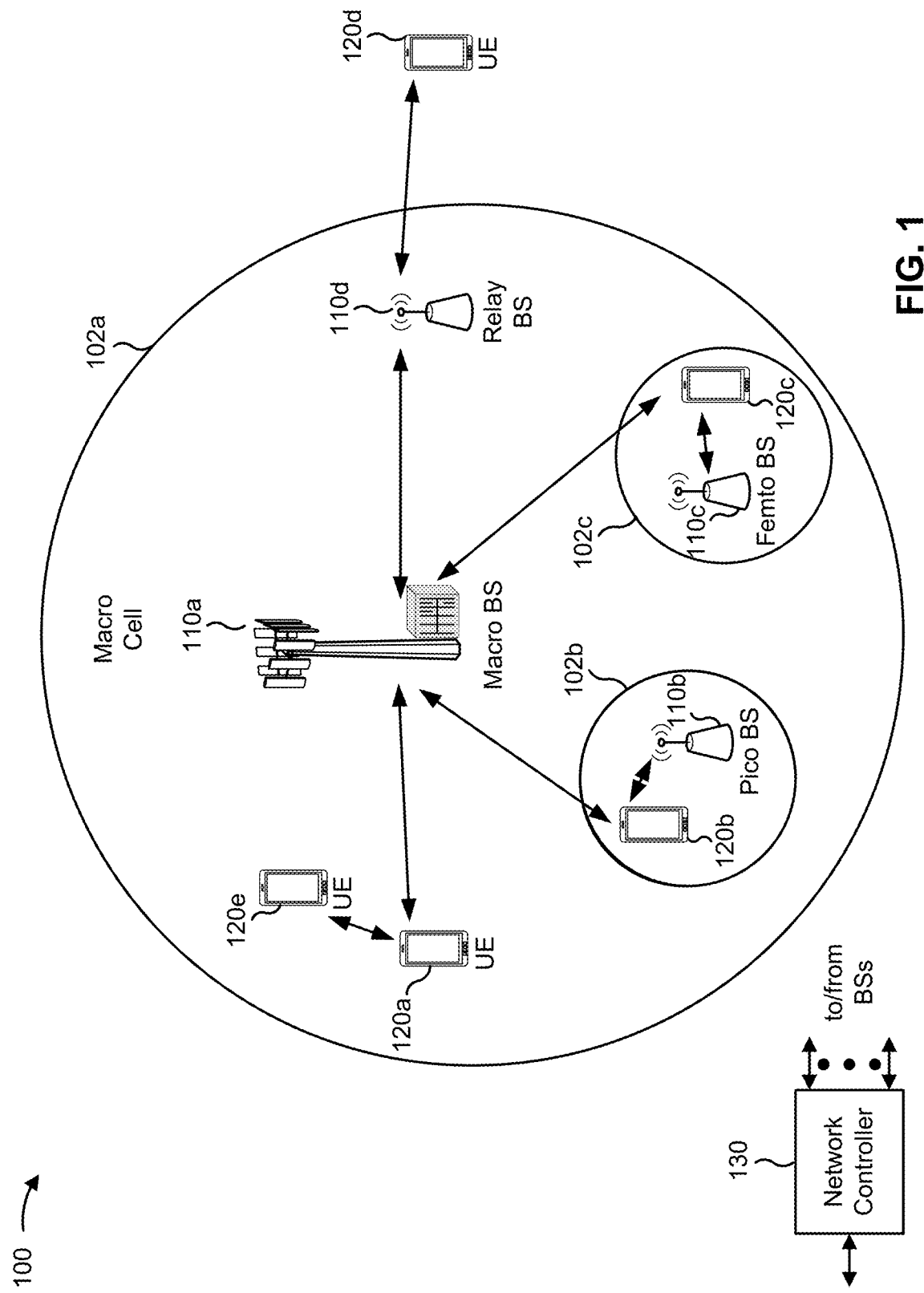
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements" or "features"). These elements may be implemented using hardware, software, or combinations thereof. Whether such elements are implemented as hardware or software depends upon the particular application and design constraints imposed on the overall system.

While some aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including one or more antennas, RF-chains, power amplifiers, modulators, buffers, processors, interleavers, adders/summers, and/or the like). It is intended that innovations described herein may be practiced in a wide variety of devices, chip-level components, systems, distributed arrangements, end-user devices, etc. of varying sizes, shapes, and constitution.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, robotics, drones, implantable devices, augmented reality devices, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120$a$ and UE 120$e$) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what was described with regard to FIG. 1.

Figure 2:
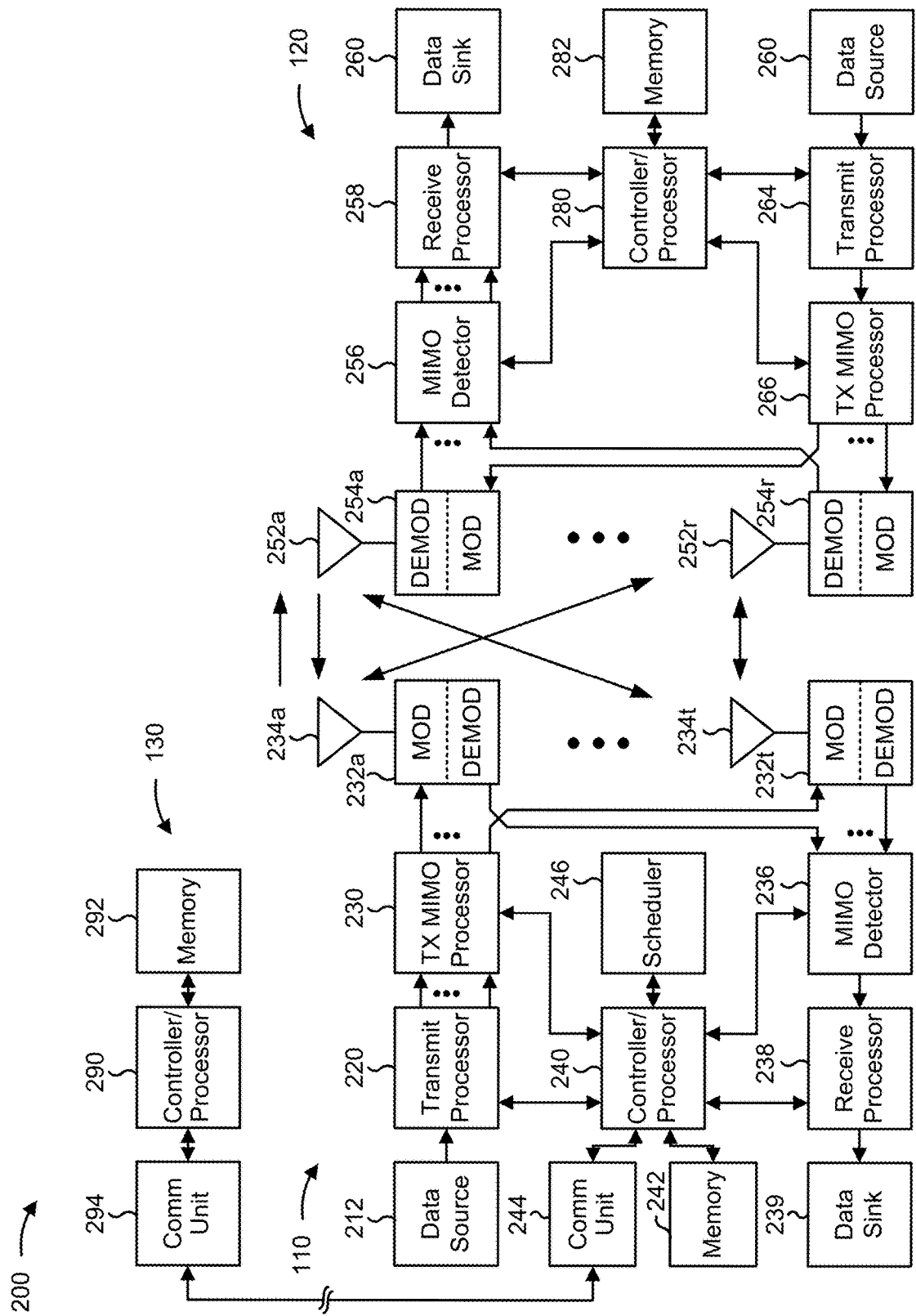
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234$a$ through 234$t$, and UE 120 may be equipped with R antennas 252$a$ through 252$r$, where in general T≥1 and R≥1.

At base station 110, a transmit processor 220 can carry out a number of functions associated with communications. For example, transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232$a$ through 232$t$. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232$a$ through 232$t$ may be transmitted via T antennas 234$a$ through 234$t$, respectively. According to various aspects described in more detail below, the synchronization signals can be generated with location encoding to convey additional information.

At UE 120, antennas 252$a$ through 252$r$ may receive downlink signals from base station 110 and/or other base stations and may provide received signals to demodulators (DEMODs) 254$a$ through 254$r$, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254$a$ through 254$r$, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254$a$ through 254$r$ (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with UE receiver processing for multi-TRP communication, as described in more detail elsewhere herein. For example, controller/processor 240 of base station 110, controller/processor 280 of UE 120, and/or any other component(s) of FIG. 2 may perform or direct operations of, for example, process 1100 of FIG. 11, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining a first set of parameters based at least in part on a first reference signal received from a first transmit receive point (TRP) and a second set of parameters based at least in part on a second reference signal received from a second TRP; means for performing a tracking loop using the first set of parameters and the second set of parameters, wherein the tracking loop comprises at least one of a frequency tracking loop or a time tracking loop; means for determining a common parameter using the first set of parameters and the second set of parameters, wherein the tracking loop is performed using the common parameter; means for determining a first error value for the first TRP and a second error value for the second TRP, wherein the first error value and the second error value identify frequency or time errors of the first TRP and the second TRP, respectively, relative to the common parameter; means for performing channel estimation for the first TRP and the second TRP using the first error value and the second error value, respectively; means for receiving at least a first part of a data channel from the first TRP and at least a second part of the data channel from the second TRP; means for processing the data channel using the common parameter; means for receiving a first data channel from the first TRP and a second data channel from the second TRP, wherein the first data channel is different from the second data channel; means for processing the first data channel and the second data channel using the common parameter; means for performing a first tracking is performed for the first TRP using the first set of parameters, and performing a second tracking loop for the second TRP using the second set of parameters; means for receiving a first data channel from the first TRP and a second data channel from the second TRP, wherein the first data channel is different from the second data channel; means for processing the first data channel using the first set of parameters; means for processing the second data channel using the second set of parameters; means for receiving at least a first part of a data channel from the first TRP and at least a second part of the data channel from the second TRP; and/or the like. In some aspects, such means may include one or more components of UE 120 described in connection with FIG. 2, such as antenna 252, DEMOD 254, MOD 232, MIMO detector 256, receive processor 258, transmit processor 264, TX MIMO processor 266, controller/processor 280, and/or the like.

As indicated above, FIG. 2 is provided merely as an example. Other examples may differ from what was described with regard to FIG. 2.

Figure 3:
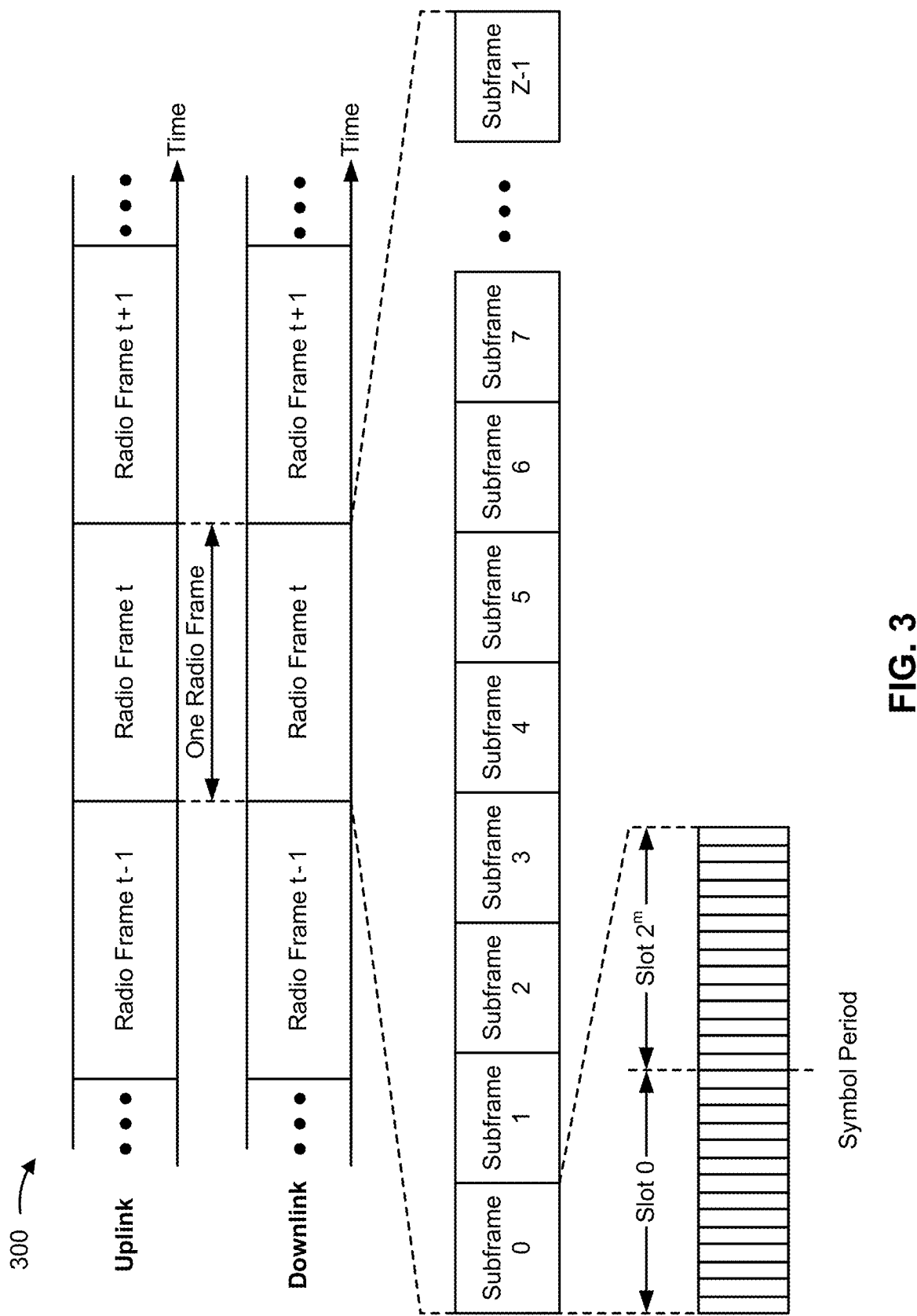
FIG. 3 is a block diagram conceptually illustrating an example of a frame structure in a wireless communication network, in accordance with various aspects of the present disclosure.

FIG. 3 shows an example frame structure 300 in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2 m slots per subframe are shown in FIG. 3, where m is a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a slot may include one or more mini-slots. A mini-slot may include a number of symbols (e.g., 2 symbols, 3 symbols, 4 symbols, and/or the like) capable of being scheduled as a unit. In some aspects, a scheduling unit may be frame-based, subframe-based, slot-based, mini-slot based, symbol-based, and/or the like.

While some techniques are described herein in connection with frames, subframes, slots, min-slots, and/or the like, these techniques may equally apply to other types of wireless communication structures or transmission time intervals (TTIs), which may be referred to using terms other than "frame," "subframe," "slot," "mini-slot," and/or the like in 5G NR. In some aspects, a wireless communication structure or a TTI may refer to a periodic time-bounded communication unit defined by a wireless communication standard and/or protocol. Additionally, or alternatively, different configurations of wireless communication structures and/or TTIs than those shown in FIG. 3 may be used.

As indicated above, FIG. 3 is provided as an example. Other examples may differ from what was described with regard to FIG. 3.

Figure 4:
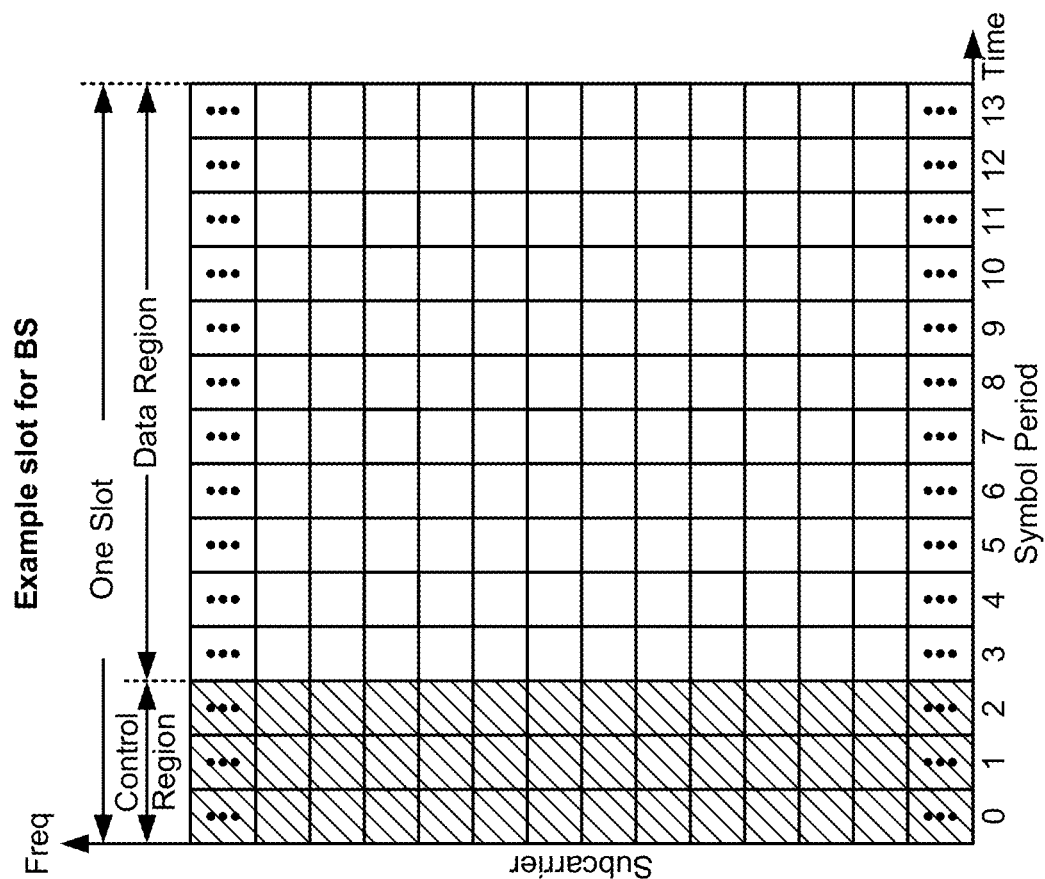
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., downlink (DL) or uplink (UL)) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what was described with regard to FIG. 4.

Figure 5:
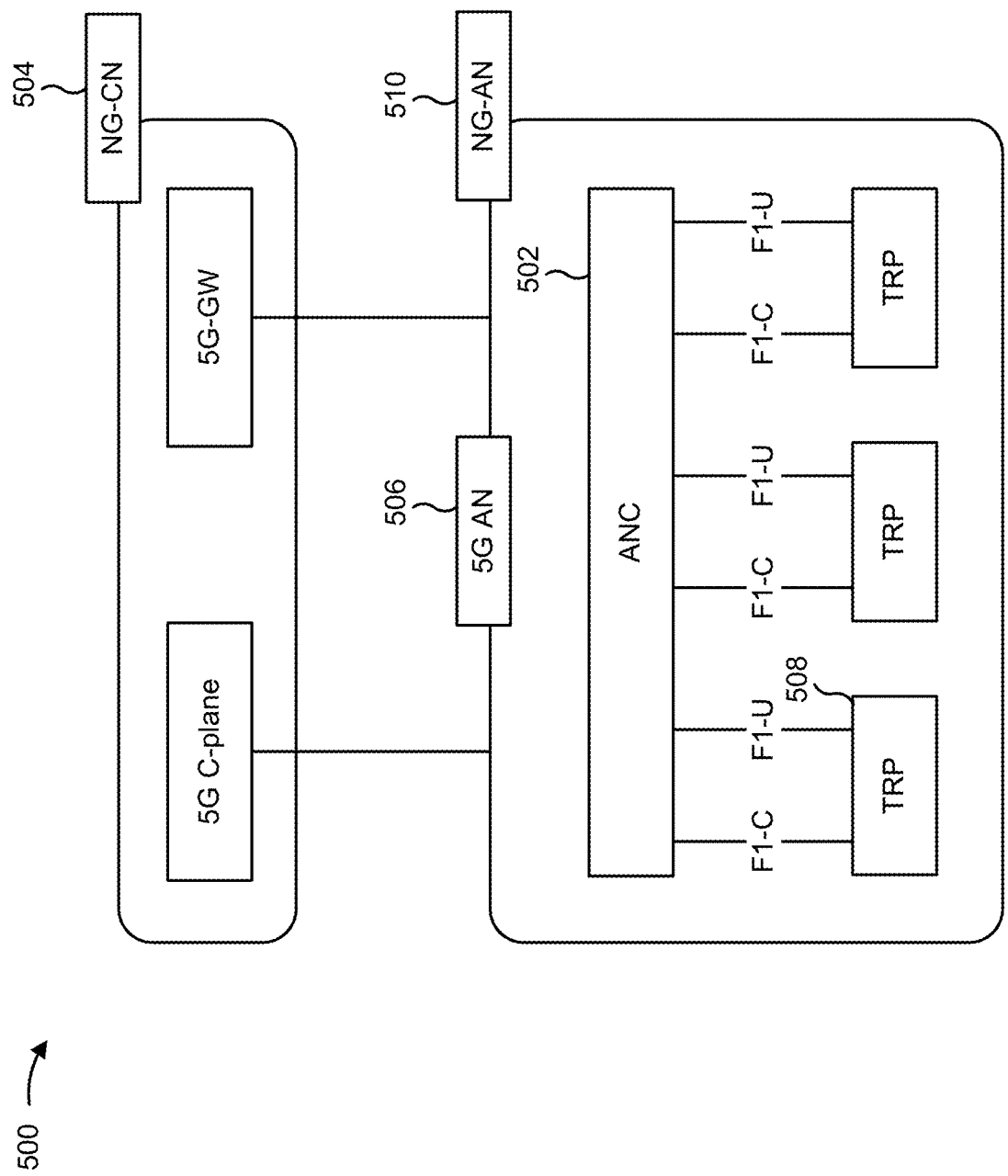
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure.

A 5G access node 506 may include an access node controller (ANC) 502. The ANC 502 may be a central unit (CU) of the distributed RAN 500. The backhaul interface to the next generation core network (NG-CN) 504 may terminate at the ANC 502. The backhaul interface to neighboring next generation access nodes (NG-ANs) may terminate at the ANC 502. The ANC 502 may include one or more TRPs 508 (which may also be referred to as BSs, NR BSs, Node Bs, 5G NBs, APs, gNB, or some other term). As described above, a TRP 508 may be used interchangeably with "cell." In some aspects, multiple TRPs 508 may be included in a single base station 110. Additionally, or alternatively, different TRPs 508 may be included in different base stations 110.

A TRP 508 may be a distributed unit (DU). A TRP 508 may be connected to a single ANC 502 or multiple ANCs 502. For example, for RAN sharing, radio as a service (RaaS), and service specific AND deployments, the TRP 508 may be connected to more than one ANC 502. A TRP 508 may include one or more antenna ports. The TRPs 508 may be configured to individually (e.g., using dynamic selection) or jointly (e.g., using joint transmission) serve traffic to a UE 120.

In some aspects, multiple TRPs 508 may transmit communications (e.g., the same communication or different communications) in the same TTI or different TTIs (e.g., slots, mini-slots, and/or the like) using different spatial parameters (e.g., different quasi co-location (QCL) parameters, different transmission configuration indicator (TCI) states, different precoding parameters, different beamforming parameters, and/or the like).

The local architecture of RAN 500 may be used to illustrate fronthaul definition. The architecture may be defined to support fronthauling solutions across different deployment types. For example, the architecture may be based at least in part on transmit network capabilities (e.g., bandwidth, latency, and/or jitter). The architecture may share features and/or components with LTE. According to aspects, the next generation AN (NG-AN) 510 may support dual connectivity with NR. The NG-AN 510 may share a common fronthaul for LTE and NR. The architecture may enable cooperation between and among TRPs 508. For example, cooperation may be preset within a TRP 508 and/or across TRPs 508 via the ANC 502. In some aspects, no inter-TRP interface may be needed/present.

In some aspects, a dynamic configuration of split logical functions may be present within the architecture of RAN 500. The packet data convergence protocol (PDCP), radio link control (RLC), media access control (MAC) protocol, and/or the like may be adaptably placed at the ANC 502 or TRP 508. According to various aspects, a base station 110 may include a central unit (CU) (e.g., ANC 502) and/or one or more distributed units (e.g., one or more TRPs 508).

As indicated above, FIG. 5 is provided merely as an example. Other examples may differ from what was described with regard to FIG. 5.

Figure 6:
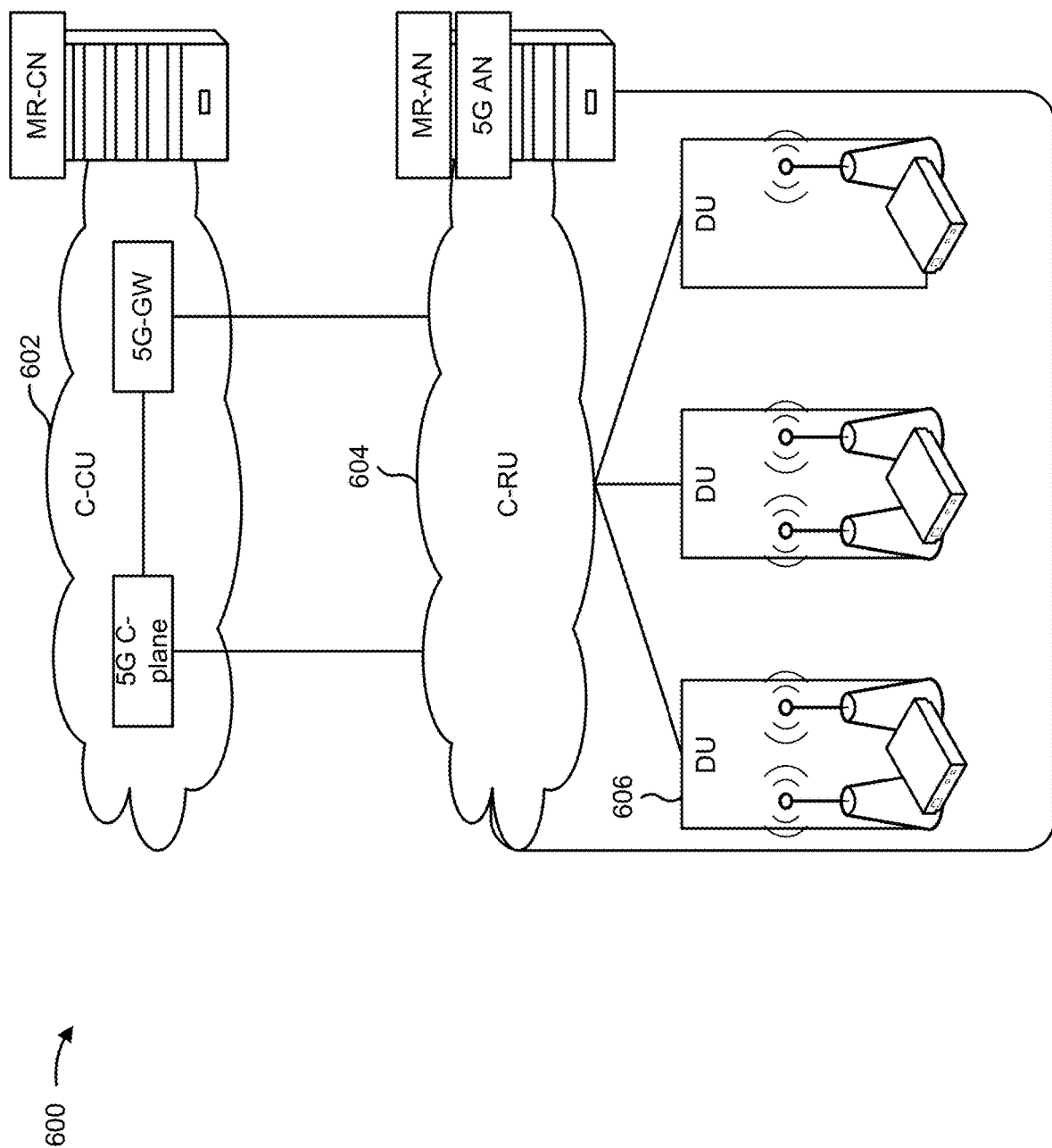
FIG. 6 illustrates an example physical architecture of a distributed RAN, in accordance with various aspects of the present disclosure.

FIG. 6 illustrates an example physical architecture of a distributed RAN 600, according to aspects of the present disclosure.

A centralized core network unit (C-CU) 602 may host core network functions. The C-CU 602 may be centrally deployed. Functionality of the C-CU 602 may be offloaded (e.g., to advanced wireless services (AWS)), in an effort to handle peak capacity. A centralized RAN unit (C-RU) 604 may host one or more ANC functions. In some aspects, the C-RU 604 may host core network functions locally. In some aspects, the C-RU 604 may have distributed deployment. A distributed unit (DU) 606 may host one or more TRPs 508. The DU 606 may be located at edges of the network with radio frequency (RF) functionality.

As indicated above, FIG. 6 is provided merely as an example. Other examples may differ from what was described with regard to FIG. 6.

Figure 7:
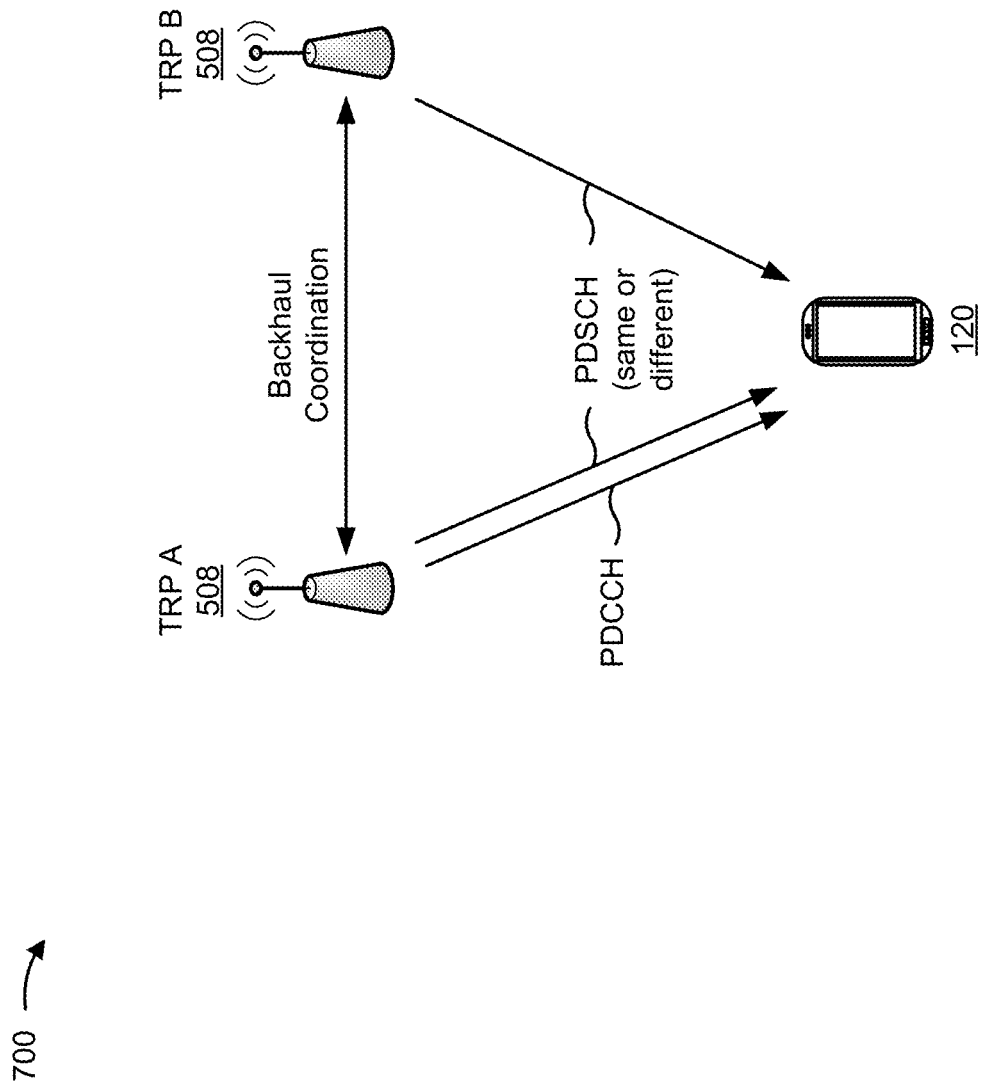
FIG. 7 is a diagram illustrating an example of multi-TRP communication, in accordance with various aspects of the present disclosure.

FIG. 7 is a diagram illustrating an example 700 of multi-TRP communication, in accordance with various aspects of the present disclosure.

As shown in FIG. 7, multiple TRPs 508 (shown as TRP A and TRP B) may communicate with the same UE 120 in a coordinated manner (e.g., using coordinated multipoint transmissions and/or the like) to improve reliability, increase throughput, and/or the like. The TRPs 508 may coordinate such communications via a backhaul, which may have a smaller delay and/or higher capacity when the TRPs 508 are co-located at the same base station 110 (e.g., different antenna arrays or panels of the same base station 110), or may have a larger delay and/or lower capacity when the TRPs 508 are located at different base stations 110.

For example, in a first multi-TRP transmission mode (e.g., Mode 1), a single physical downlink control channel (PDCCH) may be used to schedule downlink data communications for a single physical downlink shared channel (PDSCH). In this case, multiple TRPs 508 (e.g., TRP A and TRP B) may transmit communications to the UE 120 on the same PDSCH. In some aspects, different TRPs 508 may transmit in different (e.g., disjoint) sets of resource blocks (RBs) and/or different sets of symbols. Additionally, or alternatively, different TRPs 508 may transmit using different layers (e.g., different multiple input multiple output (MIMO) layers). In some aspects, transmissions on different layers may occur in overlapping resource blocks and/or overlapping symbols. As another example, in a second multi-TRP transmission mode (e.g., Mode 2), multiple PDCCHs may be used to schedule downlink data communications for multiple corresponding PDSCHs (e.g., one PDCCH for each PDSCH).

A UE may be configured (e.g., using radio resource control (RRC) signaling and/or the like) with a set of candidate transmission configuration indicator (TCI) states, which may be used to indicate quasi-collocation (QCL) relationships of data channels for the UE. Data channels associated with different QCL relationships may be transmitted using different TRPs and/or beams, and may be associated with different sets of reference signals for channel estimation and/or tracking loops, as described in more detail below. For example, a TCI state may correspond to a beam or may define a spatial filter used to transmit a beam. The UE may receive information indicating a set of active TCI states of the candidate TCI states. For example, the information indicating the active TCI states may include a media access control (MAC) control element (CE) and/or the like.

One or more TCI states for a particular data channel (e.g., a physical downlink shared control channel (PDSCH) and/or the like) may be indicated using downlink control information (DCI) for the particular data channel Specifically, a TCI field of the DCI can indicate one or more TCI states. Each TCI state may identify one or more reference signals for one or more respective QCL relationships (e.g., QCL parameters, beams, etc.), or may identify a transmission configuration indicator indicating QCL relationships for the downlink reference signals in a reference signal and the demodulation reference signal ports of the data channel. As an example, in the downlink, the reference signal may include the synchronization signal block, an aperiodic channel state information reference signal (CSI-RS), a periodic CSI-RS, a single-power CSI-RS, a tracking reference signal, and/or the like.

As indicated above, FIG. 7 is provided as an example. Other examples may differ from what was described with respect to FIG. 7.

A UE may perform a frequency tracking loop operation and/or a time tracking loop operation in order to perform receiver processing or baseband processing for a downlink channel, such as a control channel (e.g., a physical downlink control channel (PDCCH) and/or the like) and/or a data channel (e.g., a PDSCH and/or the like). A frequency tracking loop operation may indicate a frequency drift at a transmitter so that the UE can adjust a channel accordingly. A time tracking loop operation may indicate a delay and/or time error between the TRP and the UE so that the UE can perform more accurate processing of the channel Examples of the processing operations to be performed based at least in part on the frequency tracking loop operation and/or the time tracking loop operation include analog-to-digital conversion, automatic gain control, cyclic prefix removal, Fast Fourier Transformation, inverse Fast Fourier Transformation, minimized mean square error (MMSE) operations, and/or the like.

In multi-TRP operation, time and/or frequency may not be exactly synchronized between a first TRP and a second TRP due to clock offset, timing offset, and/or the like. In addition, when a first TRP and a second TRP are not collocated, the receiver timing at the UE may be affected by the delay associated with each TRP, even if transmission timing is perfectly aligned between the first TRP and the second TRP. In such a case, receiver performance of the UE with regard to multi-TRP communications may be negatively impacted.

Some techniques and apparatuses described herein provide a frequency tracking loop mechanism and a time tracking loop mechanism for multi-TRP communication. In some aspects, the UE may maintain a common tracking loop (e.g., a common set of parameters) for each TRP of a multi-TRP communication, thereby reducing processing load (e.g., baseband processor load, receiver processor load, etc.) at the UE. In some aspects, the UE may use separate tracking loops for each TRP of the multi-TRP communication, thereby improving performance of the multi-TRP communication, particularly in cases when each TRP is associated with a respective control channel that schedules a corresponding data channel Thus, downlink performance of multi-TRP communications may be improved.

Figure 8:
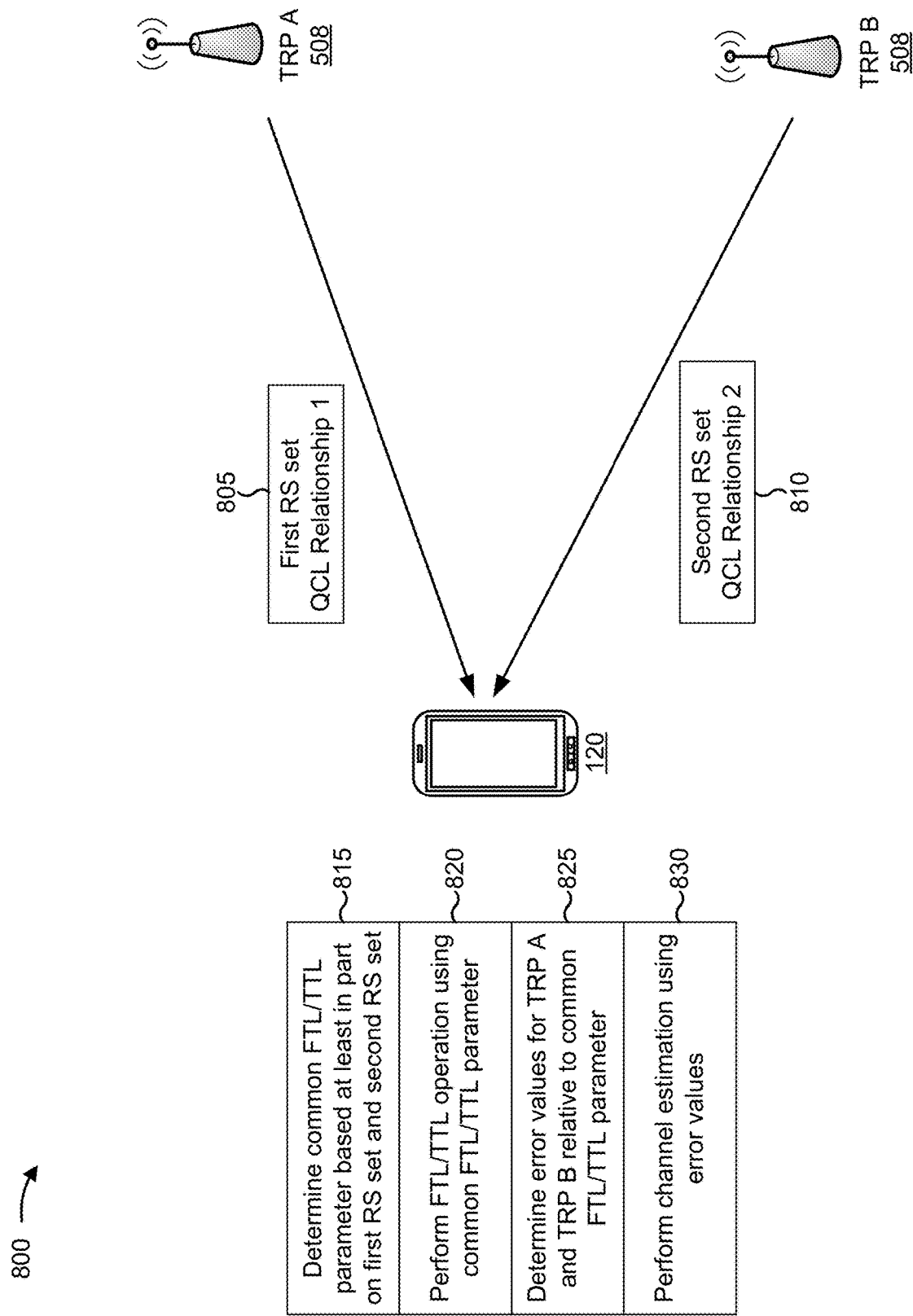
FIG. 8 is a diagram illustrating an example of performing a frequency tracking loop operation and/or a time tracking loop operation for a multi-TRP communication using a common parameter, in accordance with various aspects of the present disclosure.

FIG. 8 is a diagram illustrating an example 800 of performing a frequency tracking loop operation and/or a time tracking loop operation for a multi-TRP communication using a common parameter, in accordance with various aspects of the present disclosure. As shown, example 800 includes a UE 120, TRP A, and TRP B. As further shown, TRP A and TRP B may be TRPs 508. In some aspects, TRP A and TRP B may be associated with different BSs 110. In some aspects, TRP A and TRP B may be associated with the same BS 110. For example, TRP A and TRP B may be different TRPs of a BS 110, may be different panels of one or more TRPs 508, may be different beams of a single TRP 508, and/or the like. Furthermore, at least some of the techniques and apparatuses described herein as being performed for multi-TRP deployments may be performed for dynamic point selection (DPS) deployments, wherein TRPs, panels, and/or beams are configured dynamically per transmission using TCI states, as described in more detail below.

In some aspects, the operations described herein (in connection with FIG. 8 and elsewhere) as being performed with regard to different TRPs 508 may be performed with regard to different transmissions of a TRP 508 that are associated with different QCL relationships. In some aspects, the operations described herein as being performed for two TRPs or QCL relationships may be performed for more than two TRPs or QCL relationships.

As shown by reference number 805, TRP A may transmit a first reference signal (RS) set. For example, the first RS set may include one or more reference signals to be used by the UE 120 to perform a frequency tracking loop (FTL) operation and/or a time tracking loop (TTL) operation for TRP A. As further shown, TRP A may transmit the first reference signal set using a first QCL relationship (shown as QCL Relationship 1). A QCL relationship may identify assumptions or parameters for transmission of a data channel, such as a QCL relationship between the data channel and a reference signal, and/or the like. The first RS set and/or the second RS set may include any reference signal described elsewhere herein.

In some aspects, TRP A may transmit the first RS set in a PDSCH, and/or the like. For example, TRP A and TRP B may transmit respective PDSCHs. Each PDSCH may include a respective RS set to be used to perform an FTL operation and/or a TTL operation, in accordance with TRP parameters of each PDSCH. In some aspects, the PDSCHs may be scheduled by respective PDCCHs, which may indicate the QCL relationships and/or RS sets, as described in more detail elsewhere herein.

As shown by reference number 810, TRP B may transmit a second RS set. For example, the second RS set may include one or more reference signals to be used by the UE 120 to perform an FTL operation and/or a TTL operation for TRP B. In some aspects, the first RS set and the second RS set may include the same RSs. In some aspects, the first RS set may include one or more RSs different from the second RS set. As further shown, TRP B may transmit the second RS set based at least in part on a second QCL relationship (e.g., QCL Relationship 2), which may be different from the first QCL relationship. In some aspects, TRP B may transmit the second RS set in a PDSCH and/or the like.

In some aspects, an RS set for a transmission may be indicated by a TCI state or a QCL relationship. For example, a TCI state may indicate which RSs are to be used for one or more QCL relationships. In some aspects, the UE 120 may receive information identifying a TCI state, a QCL relationship, and/or the like. For example, a control channel for the first RS set and/or the second RS set (not shown) may indicate the TCI state to be used for the first RS set and/or the second RS set. For a more detailed description of FTL/TTL operations with regard to dynamic indication of TCI states, refer to the description accompanying FIG. 10.

As shown by reference number 815, the UE 120 may determine a common FTL parameter and/or a common TTL parameter (shown as FTL/TTL parameter) based at least in part on the first RS set and the second RS set. As used herein, "FTL/TTL parameter" may refer to one or more of an FTL parameter or a TTL parameter.

The UE 120 may determine the common FTL/TTL parameter based at least in part on respective FTL/TTL parameters of TRP A and TRP B. For example, the UE 120 may determine a first set of FTL/TTL parameters for TRP A using the first RS set, and may determine a second set of FTL/TTL parameters for TRP B using the second RS set. An FTL parameter may include, for example, a frequency offset from a target value. A TTL parameter may include, for example, a time offset or delay relative to a target value, a time of arrival associated with a first arrival path, and/or the like.

In some aspects, the UE 120 may determine the common FTL/TTL parameter based at least in part on combining the first set of FTL/TTL parameters and the second set of FTL/TTL parameters. For example, assume that the common FTL/TTL parameter is to be a first arrival path value (e.g., a first arrival time for an RS set) for TRP A and TRP B. In that case, the UE 120 may determine a first arrival path value for TRP A (e.g., using the first RS set) and a first arrival path value for TRP B (e.g., using the second RS set). The UE 120 may determine the common FTL/TTL parameter (e.g., the common arrival path) by combining the first arrival path value for TRP A and the first arrival path value for TRP B. For example, the UE 120 may determine an average of the first arrival path values, a lowest first arrival path value, a median first arrival path value (e.g., when more than two first arrival path values are to be combined), and/or the like. Thus, the UE 120 may determine a common FTL/TTL parameter by combining FTL/TTL parameters for two or more TRPs 508.

As shown by reference number 820, the UE 120 may perform an FTL operation and/or a TTL operation (shown as FTL/TTL operation) using the common FTL/TTL parameter. For example, the UE 120 may receive a data channel based at least in part on the common FTL/TTL parameter. As another example, the UE 120 may process a received transmission based at least in part on the common FTL/TTL parameter. As yet another example, the UE 120 may perform frontend processing jointly for TRP A and TRP B using the common FTL/TTL parameter (e.g., analog-to-digital conversion, automatic gain control, cyclic prefix removal, a Fast Fourier Transform (FFT), an inverse FFT (IFFT), a minimum mean squared error-based channel estimation, etc.).

By performing the FTL operation and/or the TTL operation using the common FTL/TTL parameter, the UE 120 may conserve processor resources in comparison to performing separate FTL operations and/or TTL operations for TRP A and TRP B. For example, if the UE 120 were to perform frontend processing separately for TRP A and TRP B, the UE 120 may use more processing resources (e.g., frontend processing resources, baseband processing resources, etc.) than the UE 120 would use by performing frontend processing jointly for TRP A and TRP B.

As shown by reference number 825, in some aspects, the UE 120 may determine error values for TRP A and TRP B relative to the common FTL/TTL parameter. The UE 120 may determine the error values in order to perform channel estimation for TRP A and TRP B and/or to update the channels transmitted by TRP A and/or TRP B. In some aspects, the UE 120 may determine a frequency error value. For example, if the common FTL/TTL parameter identifies a frequency error of f0, and the UE 120 identifies a frequency error for TRP A of f1, the UE 120 may determine the frequency error value for TRP A, relative to the common FTL/TTL parameter, as f1-f0. As another example, if the common FTL/TTL parameter identifies a timing error of t0, and the UE 120 identifies a timing error value for TRP A of t1, the UE 120 may determine the timing error value for TRP A, relative to the common FTL/TTL parameter, as t1-t0. The UE 120 may perform similar operations for TRP B.

As shown by reference number 830, the UE 120 may perform channel estimation using the error values (e.g., the error values relative to the common FTL/TTL parameter). For example, when the UE 120 determines a timing error value, the UE 120 may use the timing error value for an IFFT-based channel estimation technique or a minimum mean squared error based channel estimation technique separately with regard to TRP A and TRP B. When the UE 120 determines a frequency error value, the UE 120 may use the frequency error value to update a channel for each symbol in accordance with the frequency error value. In this way, the UE 120 may perform separate channel estimation for TRP A and TRP B, even when the UE 120 uses a common FTL/TTL parameter and/or performs joint frontend processing for TRP A and TRP B.

As indicated above, FIG. 8 is provided as an example. Other examples may differ from what was described with respect to FIG. 8.

Figure 9:
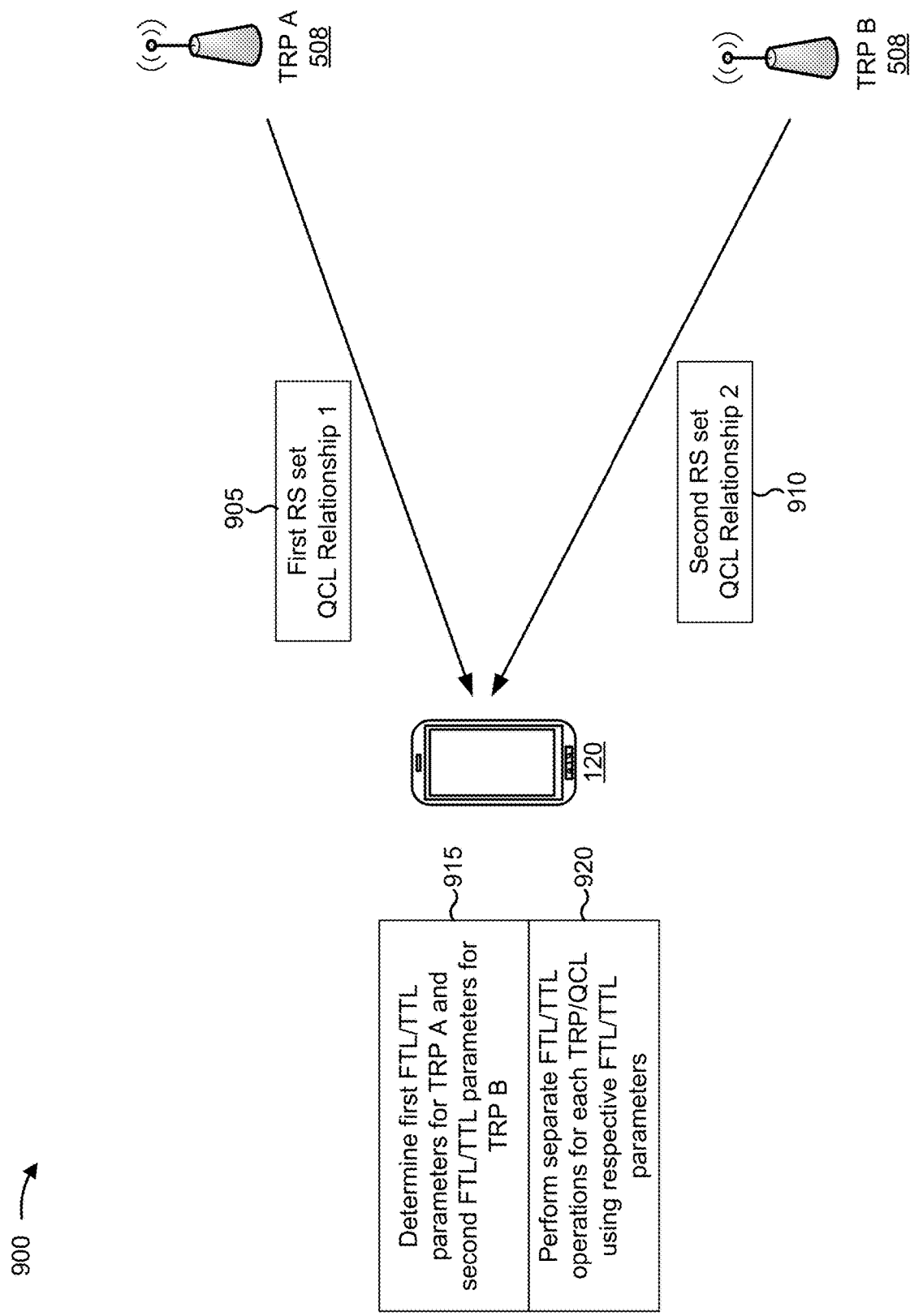
FIG. 9 is a diagram illustrating an example of performing frequency tracking loops and/or time tracking loops for a multi-TRP communication using respective parameters, in accordance with various aspects of the present disclosure.

FIG. 9 is a diagram illustrating an example 900 of performing frequency tracking loop operations and/or time tracking loop operations for a multi-TRP communication using respective parameters, in accordance with various aspects of the present disclosure. As shown, example 900 includes a UE 120, TRP A, and TRP B. As further shown, TRP A and TRP B may be TRPs 508. In some aspects, TRP A and TRP B may be associated with different BSs 110. In some aspects, TRP A and TRP B may be associated with the same BS 110. For example, TRP A and TRP B may be different TRPs of a BS 110, may be different panels of a TRP 508, may be different beams of a TRP 508, and/or the like.

As shown by reference number 905, the UE 120 may receive a first RS set, associated with a first QCL relationship, from TRP A. As shown by reference number 910, the UE 120 may receive a second RS set, associated with a second QCL relationship, from TRP B. The first RS set and the second RS set are described in more detail in connection with FIG. 8, above.

As shown by reference number 915, the UE 120 may determine first FTL/TTL parameters for TRP A and may determine second FTL/TTL parameters for TRP B. For example, the UE 120 may determine the first FTL/TTL parameters using the first RS set and the second FTL/TTL parameters using the second RS set. The first FTL/TTL parameters and the second FTL/TTL parameters may include any FTL parameter and/or any TTL parameter described herein.

As shown by reference number 920, the UE 120 may perform separate FTL operations and/or TTL operations for each TRP (e.g., each QCL relationship) using the respective FTL/TTL parameters. For example, the UE 120 may maintain a first FTL and/or a first TTL (e.g., a first FTL/TTL) for TRP A, and may maintain a second FTL and/or a second TTL (e.g., a second FTL/TTL) for TRP B, wherein the second FTL is separate from the first FTL and the second TTL is separate from the first TTL. In some aspects, the UE 120 may receive respective data channels or parts of data channels based at least in part on the respective FTLs/TTLs. As another example, the UE 120 may process respective received transmissions based at least in part on the respective FTLs/TTLs. As yet another example, the UE 120 may perform frontend processing separately for TRP A and TRP B using the respective FTLs/TTLs (e.g., analog-to-digital conversion, automatic gain control, cyclic prefix removal, a Fast Fourier Transform (FFT), an inverse FFT (IFFT), a minimum mean squared error-based channel estimation, etc.). In some aspects, the UE 120 may perform channel estimation separately for TRP A and TRP B using the respective FTLs/TTLs.

In this way, the UE 120 may improve accuracy of frontend processing for TRP A and TRP B relative to using a common FTL/TTL parameter for joint frontend processing. Separate frontend processing, as described in connection with FIG. 9, may be particularly useful for Mode 2 multi-TRP transmission, wherein separate PDCCHs are used to schedule the respective PDSCHs.

As indicated above, FIG. 9 is provided as an example. Other examples may differ from what was described with respect to FIG. 9.

Figure 10:
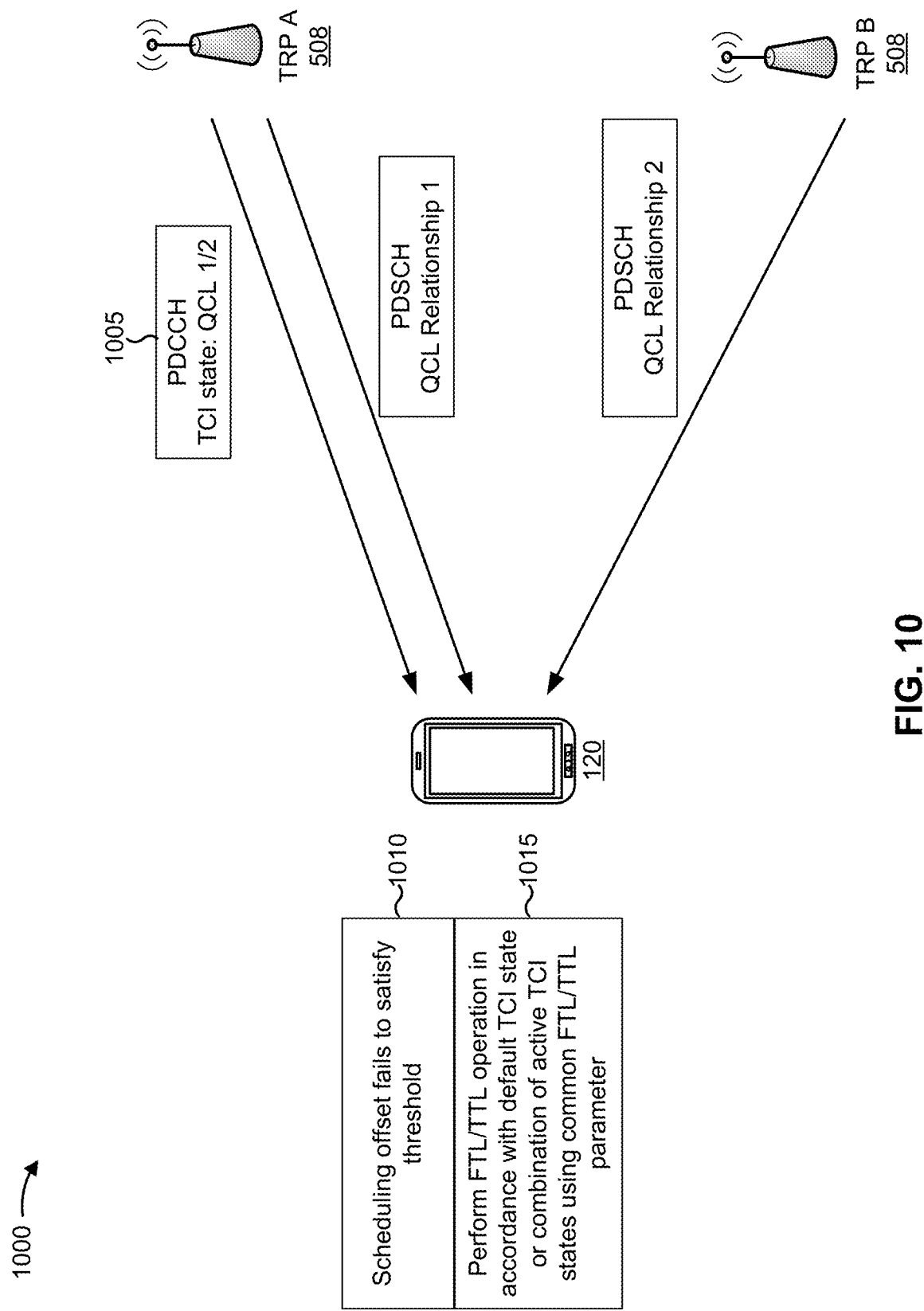
FIG. 10 is a diagram illustrating an example of performing a frequency tracking loop and/or a time tracking loop based at least in part on a dynamic TCI state for a multi-TRP communication, in accordance with various aspects of the present disclosure.

FIG. 10 is a diagram illustrating an example 1000 of performing a frequency tracking loop operation and/or a time tracking loop operation based at least in part on a dynamic TCI state for a multi-TRP communication, in accordance with various aspects of the present disclosure. As shown, example 1000 includes a UE 120, TRP A, and TRP B. As further shown, TRP A and TRP B may be TRPs 508. In some aspects, TRP A and TRP B may be associated with different BSs 110. In some aspects, TRP A and TRP B may be associated with the same BS 110. For example, TRP A and TRP B may be different TRPs of a BS 110, may be different panels of a TRP 508, may be different beams of a TRP 508, and/or the like.

As shown by reference number 1005, TRP A may provide a control channel (e.g., a PDCCH) to the UE 120. As further shown, the PDCCH may indicate a TCI state (e.g., QCL 1/2, indicating that QCL Relationship 1 is to be used for TRP A and QCL Relationship 2 is to be used for TRP B). For example, the indication of the TCI state may be provided in DCI of the PDCCH, and can dynamically change. The TCI state identified by the indication may be one of the active TCI states of the UE 120, which may be configured and/or activated as described elsewhere herein. When the TCI state changes, the QCL relationships may change accordingly. In the multi-TRP case, the set of two or more TRPs used for transmission at a given instance can change. In this case, the TCI field may indicate one or more TCI states corresponding to two QCL relationships (e.g., QCL Relationship 1 and QCL Relationship 2). In the case of a single TRP, the TRP, panel, or beam used for transmission may be changed dynamically. This may be referred to as dynamic point selection (DPS) operation.

Before the UE 120 detects the PDCCH, the UE 120 may not be aware of the QCL relationships to be used to receive the corresponding PDSCH. If a scheduling offset (e.g., a configured or indicated time between receiving the PDCCH and the corresponding PDSCH) does not satisfy a threshold (e.g., fails to satisfy the threshold), then the UE 120 may use a QCL assumption (e.g., a QCL relationship, a set of QCL parameters, etc.) that is based on a default TCI state, such as a TCI state used for control channel QCL indication for a lowest control resource set identifier in the slot that includes the PDSCH. In some aspects, the threshold may be configured as a length of time or a number of symbols (e.g., 28 OFDM symbols or a different value).

In some aspects, TRP A may provide a first PDCCH and TRP B may provide a second PDCCH. For example, TRP A and TRP B may each provide a PDCCH for a PDSCH to be transmitted by TRP A and TRP B, respectively. In such a case, the TCI state may be identified by one of the first PDCCH or the second PDCCH (e.g., for both PDSCHs) or respective TCI states may be identified by both PDCCHs.

As shown by reference number 1010, the UE 120 may determine that the scheduling offset between the PDCCH and the PDSCHs fails to satisfy the threshold. Accordingly, and as shown by reference number 1015, the UE 120 may perform an FTL operation and/or a TTL operation (e.g., FTL/TTL operation) in accordance with a default TCI state, a set of default TCI states, or a combination of active TCI states of the UE 120. In the case wherein the UE 120 performs an FTL/TTL operation in accordance with the default TCI state or the set of default TCI states, the UE 120 may identify one or more RS and/or QCL relationship for the TRP A and/or the TRP B in accordance with a TCI state used for control channel QCL indication for a lowest control resource set identifier in the slot that includes the PDSCH. The UE 120 may determine an FTL/TTL parameter using the one or more RS and/or the QCL relationships, and may use the FTL/TTL parameter for joint frontend processing of the PDSCHs of TRP A and TRP B.

In the case wherein the UE 120 performs an FTL/TTL operation in accordance with the combination of active TCI states, the UE 120 may determine a common FTL/TTL parameter in accordance with the combination of active TCI states. For example, each active TCI state may identify an RS, a QCL relationship, and/or the like, for the FTL/TTL operation. The UE 120 may determine respective FTL/TTL parameters for each active TCI state, and may determine a common FTL/TTL parameter using the respective FTL/TTL parameters (e.g., based on an average value, a best value, a median value, etc.). The UE 120 may perform joint frontend processing of the PDSCHs using the common FTL/TTL parameter, as described in more detail in connection with FIG. 8, which conserves processing resources of the UE 120. Furthermore, by performing an FTL/TTL operation in accordance with the combination of active TCI states, the UE 120 may more closely approximate the indicated TCI states that are actually to be used for the PDSCHs than if the UE 120 uses the default TCI state.

In some aspects, the UE 120 may perform channel estimation based at least in part on the default TCI state or the combination of active TCI states. For example, if the threshold is satisfied, the UE 120 may determine an FTL/TTL parameter using the default TCI state, or may determine the common FTL/TTL parameter using the combination of active TCI states. The UE 120 may determine error values relative to the FTL/TTL parameter or the common FTL/TTL parameter for channel estimation (e.g., a time error value for TRP A, a time error value for TRP B, a frequency error value for TRP A, a frequency error value for TRP B, etc.). The UE 120 may perform channel estimation using the error values, as described in more detail in connection with FIG. 8, above. In this way, the UE 120 may perform an FTL operation and/or a TTL operation using a configuration that does not change dynamically with the TCI state. Furthermore, the UE 120 may perform channel estimation using error values relative to a common or default-TCI-state-based FTL/TTL parameter, thereby enabling independent channel estimation when joint frontend processing is performed. Thus, frontend processing resources are conserved while preserving accuracy of channel estimation.

In some aspects, the scheduling offset may satisfy the threshold. In such a case, the operations described in connection with FIGS. 8 and/or 9 may be performed. For example, in a DPS case, the TTL operation and/or the FTL operation may be updated or performed based at least in part on the QCL relationship indicated by the TCI state. In a multi-TRP case, where the TCI state indicates QCL relationships for both PDSCHs, a common FTL/TTL parameter may be determined in accordance with the QCL relationships (as described in more detail in connection with FIG. 8, above), or two separate FTLs and/or TTLs may be maintained in accordance with the QCL relationships (as described in connection with FIG. 9, above).

As indicated above, FIG. 10 is provided as an example. Other examples may differ from what was described with respect to FIG. 10.

Figure 11:
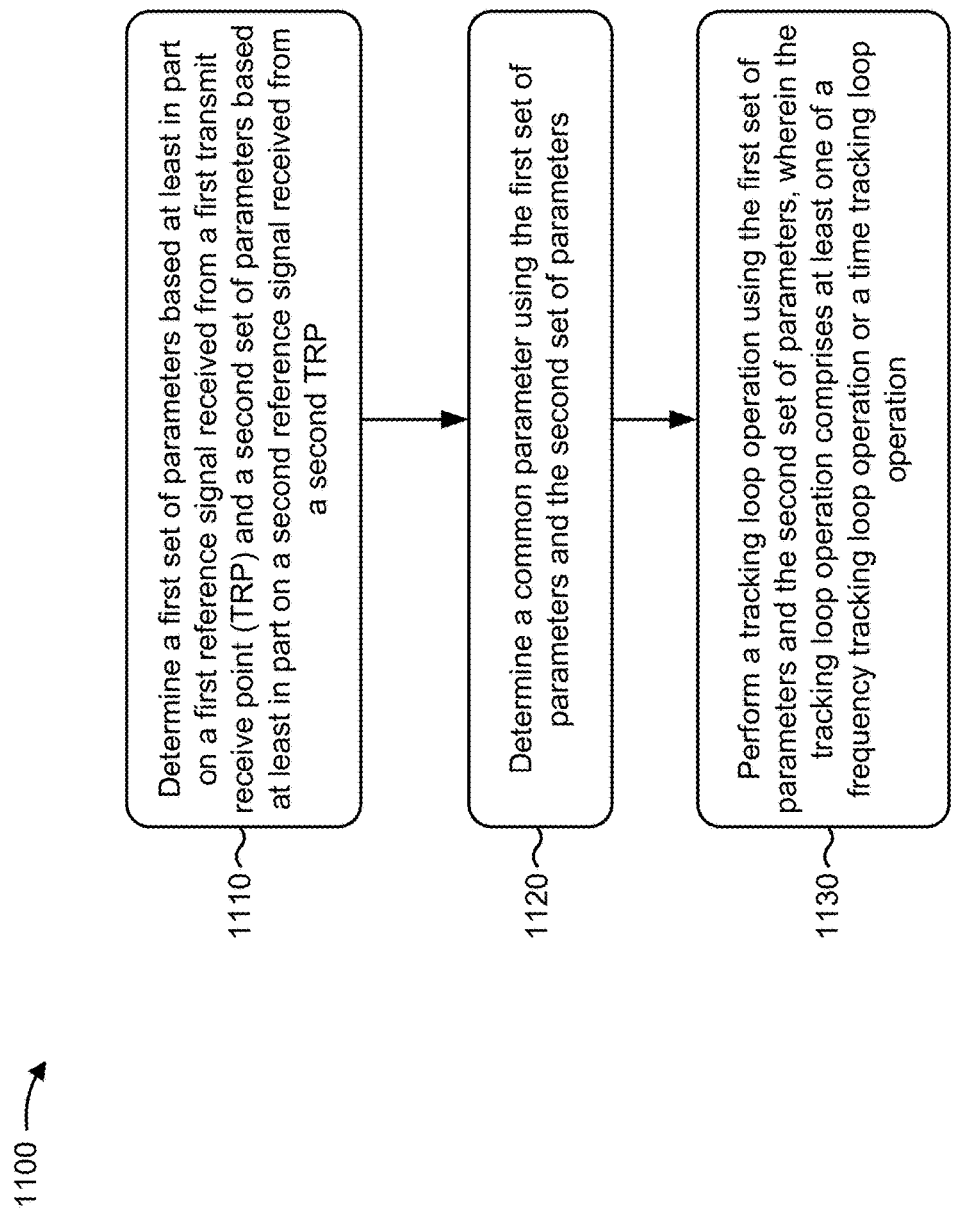
FIG. 11 is a diagram illustrating an example process performed, for example, by a user equipment, in accordance with various aspects of the present disclosure.

FIG. 11 is a diagram illustrating an example process 1100 performed, for example, by a UE, in accordance with various aspects of the present disclosure. Example process 1100 is an example where a UE (e.g., UE 120) performs receiver processing for a multi-TRP communication.

As shown in FIG. 11, in some aspects, process 1100 may include determining a first set of parameters based at least in part on a first reference signal received from a first transmit receive point (TRP) and a second set of parameters based at least in part on a second reference signal received from a second TRP (block 1110). For example, the UE (e.g., using antenna 252, DEMOD 254, MIMO detector 256, receive processor 258, controller/processor 280, and/or the like) may determine a first set of parameters based at least in part on a first reference signal (e.g., a first RS set) received from a first TRP (e.g., TRP 508, TRP A in FIGS. 8-10, etc.) and a second set of parameters based at least in part on a second reference signal (e.g., a second RS set) received from a second TRP (e.g., TRP 508, TRP B in FIGS. 8-10, etc.). In some aspects, the first reference signal may be associated with a first TCI state and/or QCL relationship and the second reference signal may be associated with a second TCI state and/or QCL relationship.

As shown in FIG. 11, in some aspects, process 1100 may include determining a common parameter using the first set of parameters and the second set of parameters (block 1120). For example, the UE (e.g., using antenna 252, DEMOD 254, MIMO detector 256, receive processor 258, controller/processor 280, and/or the like) may determine a common parameter using the first set of parameters and the second set of parameters.

As shown in FIG. 11, in some aspects, process 1100 may include performing a tracking loop using the common parameter or the first set of parameters and the second set of parameters, wherein the tracking loop comprises at least one of a frequency tracking loop or a time tracking loop (block 1130). For example, the UE (e.g., using antenna 252, DEMOD 254, MIMO detector 256, receive processor 258, controller/processor 280, and/or the like) may perform a tracking loop operation using the common parameter, or using the first set of parameters and the second set of parameters. The tracking loop operation may comprise at least one of a frequency tracking loop operation or a time tracking loop operation.

Process 1100 may include additional aspects, such as any single aspect or any combination of aspects described below and/or in connection with one or more other processes described elsewhere herein.

In a first aspect, the UE may determine a first error value for the first TRP and a second error value for the second TRP, wherein the first error value and the second error value identify frequency or time errors of the first TRP and the second TRP, respectively, relative to the common parameter; and perform channel estimation for the first TRP and the second TRP using the first error value and the second error value, respectively.

In a second aspect, alone or in combination with the first aspect, the UE may receive at least a first part of a data channel from the first TRP and at least a second part of the data channel from the second TRP; and process the data channel using the common parameter. In a third aspect, alone or in combination with one or more of the first aspect and the second aspect, the UE may receive a first data channel from the first TRP and a second data channel from the second TRP, wherein the first data channel is different from the second data channel; and process the first data channel and the second data channel using the common parameter.

In a fourth aspect, alone or in combination with one or more of the first through third aspects, performing the tracking loop further comprises performing a first tracking loop operation for the first TRP using the first set of parameters, and performing a second tracking loop operation for the second TRP using the second set of parameters.

In a fifth aspect, alone or in combination with one or more of the first through fourth aspects, the first tracking loop operation uses a first set of reference signals and the second tracking loop operation uses a second set of reference signals, wherein the first set of reference signals is different from the second set of reference signals. In a sixth aspect, alone or in combination with one or more of the first through fifth aspects, the UE may receive a first data channel from the first TRP and a second data channel from the second TRP, wherein the first data channel is different from the second data channel; process the first data channel using the first set of parameters; and process the second data channel using the second set of parameters.

In a seventh aspect, alone or in combination with one or more of the first through sixth aspects, the UE may receive at least a first part of a data channel from the first TRP and at least a second part of the data channel from the second TRP. In an eighth aspect, alone or in combination with one or more of the first through seventh aspects, the first TRP is associated with a first quasi-collocation relationship, and wherein the second TRP is associated with a second quasi-collocation relationship. In a ninth aspect, alone or in combination with one or more of the first through third aspects, when the UE is configured with a transmission configuration indicator that can change dynamically, and when a scheduling offset between a control channel and a corresponding data channel fails to satisfy a threshold, the tracking loop operation is performed in accordance with a default transmission configuration indicator (e.g., a default TCI state). In a tenth aspect, alone or in combination with one or more of the first through ninth aspects, when the UE is configured with a transmission configuration indicator (e.g., a TCI state) that can change dynamically, and when a scheduling offset between a control channel and a corresponding data channel fails to satisfy a threshold, the tracking loop operation is performed in accordance with a combination of active transmission configuration indicator states. In an eleventh aspect, alone or in combination with one or more of the first through tenth aspects, when the UE is configured with a transmission configuration indicator that can change dynamically, and when a scheduling offset between a control channel and a corresponding data channel satisfies a threshold, channel estimation is performed based at least in part on one or more indicated transmission configuration indicators.

In a twelfth aspect, alone or in combination with one or more of the first through eleventh aspects, when the UE is configured with a transmission configuration indicator that can change dynamically, and when a scheduling offset between a control channel and a corresponding data channel satisfies a threshold, the tracking loop operation is performed in accordance with a default transmission configuration indicator or a combination of active transmission configuration indicator states. In a thirteenth aspect, alone or in combination with one or more of the first through twelfth aspects, channel estimation is performed based at least in part on error values for the first TRP and the second TRP relative to the default transmission configuration indicator or the combination of active transmission configuration indicator states. In a fourteenth aspect, alone or in combination with one or more of the first through thirteenth aspects, the error values are based at least in part on the transmission configuration indicator.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining a first set of tracking loop parameters based at least in part on a first reference signal received from a first transmit receive point (TRP) and a second set of tracking loop parameters based at least in part on a second reference signal received from a second TRP;
   determining a common tracking loop parameter based at least in part on combining the first set of tracking loop parameters and the second set of tracking loop parameters; and
   performing a tracking loop operation using the common tracking loop parameter, wherein the tracking loop operation comprises at least one of a frequency tracking loop operation or a time tracking loop operation,
      wherein, when the UE is configured with a transmission configuration indicator that can change dynamically, and when a scheduling offset between a control channel and a corresponding data channel satisfies a threshold, the tracking loop operation is performed in accordance with a default transmission configuration indicator or a combination of active transmission configuration indicator states.

2. The method of claim 1, further comprising:
   determining a first error value for the first TRP and a second error value for the second TRP,
      wherein the first error value and the second error value identify frequency or time errors of the first TRP and the second TRP, respectively, relative to the common tracking loop parameter; and
   performing channel estimation for the first TRP and the second TRP using the first error value and the second error value, respectively.

3. The method of claim 1, further comprising:
   receiving at least a first part of a data channel from the first TRP and at least a second part of the data channel from the second TRP; and
   processing the data channel using the common tracking loop parameter.

4. The method of claim 1, further comprising:
   receiving a first data channel from the first TRP and a second data channel from the second TRP, wherein the first data channel is different from the second data channel; and
   processing the first data channel and the second data channel using the common tracking loop parameter.

5. The method of claim 1, wherein the first TRP is associated with a first quasi-collocation relationship, and wherein the second TRP is associated with a second quasi-collocation relationship.

6. The method of claim 1, wherein, when the UE is configured with the transmission configuration indicator that can change dynamically, and when the scheduling offset between the control channel and the corresponding data channel fails to satisfy the threshold, the tracking loop operation is performed in accordance with the default transmission configuration indicator.

7. The method of claim 1, wherein, when the UE is configured with the transmission configuration indicator that can change dynamically, and when the scheduling offset between the control channel and the corresponding data channel fails to satisfy the threshold, the tracking loop operation is performed in accordance with the combination of active transmission configuration indicator states.

8. The method of claim 1, further comprising:
   when the UE is configured with }the transmission configuration indicator that can change dynamically, and when the scheduling offset between the control channel and the corresponding data channel satisfies the threshold, preforming channel estimation based at least in part on one or more indicated transmission configuration indicators.

9. The method of claim 1, further comprising:
performing channel estimation based at least in part on error values for the first TRP and the second TRP relative to the default transmission configuration indicator or the combination of active transmission configuration indicator states.

10. The method of claim 9, wherein the error values are based at least in part on the transmission configuration indicator.

11. A user equipment (UE) for wireless communication, comprising:
a memory; and
one or more processors operatively coupled to the memory, the memory and the one or more processors configured to:
determine a first set of tracking loop parameters based at least in part on a first reference signal received from a first transmit receive point (TRP) and a second set of tracking loop parameters based at least in part on a second reference signal received from a second TRP;
determine a common tracking loop parameter based at least in part on combining the first set of tracking loop parameters and the second set of tracking loop parameters; and
perform a tracking loop operation using the common tracking loop parameter, wherein the tracking loop operation comprises at least one of a frequency tracking loop operation or a time tracking loop operation,
wherein, when the UE is configured with a transmission configuration indicator that can change dynamically, and when a scheduling offset between a control channel and a corresponding data channel satisfies a threshold, the tracking loop operation is performed in accordance with a default transmission configuration indicator or a combination of active transmission configuration indicator states.

12. The UE of claim 11, wherein the one or more processors are further configured to:
determine a first error value for the first TRP and a second error value for the second TRP,
wherein the first error value and the second error value identify frequency or time errors of the first TRP and the second TRP, respectively, relative to the common tracking loop parameter; and
perform channel estimation for the first TRP and the second TRP using the first error value and the second error value, respectively.

13. The UE of claim 11, wherein the one or more processors are further configured to:
receive at least a first part of a data channel from the first TRP and at least a second part of the data channel from the second TRP; and
process the data channel using the common tracking loop parameter.

14. The UE of claim 11, wherein the one or more processors are further configured to:
receive a first data channel from the first TRP and a second data channel from the second TRP, wherein the first data channel is different from the second data channel; and
process the first data channel and the second data channel using the common tracking loop parameter.

15. The UE of claim 11, wherein the first TRP is associated with a first quasi-collocation relationship, and wherein the second TRP is associated with a second quasi-collocation relationship.

16. The UE of claim 11, wherein, when the UE is configured with the transmission configuration indicator that can change dynamically, and when the scheduling offset between the control channel and the corresponding data channel fails to satisfy the threshold, the tracking loop operation is performed in accordance with the default transmission configuration indicator.

17. The UE of claim 11, wherein, when the UE is configured with the transmission configuration indicator that can change dynamically, and when the scheduling offset between the control channel and the corresponding data channel fails to satisfy the threshold, the tracking loop operation is performed in accordance with the combination of active transmission configuration indicator states.

18. The UE of claim 11, wherein, the one or more processors are further configured to:
when the UE is configured with the transmission configuration indicator that can change dynamically, and when the scheduling offset between the control channel and the corresponding data channel satisfies the threshold, perform channel estimation based at least in part on one or more indicated transmission configuration indicators.

19. The UE of claim 11, wherein the one or more processors are further configured to:
perform channel estimation based at least in part on error values or the first TRP and the second TRP relative to the default transmission configuration indicator or the combination of active transmission configuration indicator states.

20. The UE of claim 19, wherein the error values are based at least in part on the transmission configuration indicator.

21. A non-transitory computer-readable medium storing one or more instructions for wireless communication, the one or more instructions comprising:
one or more instructions that, when executed by one or more processors of a user equipment (UE), cause the one or more processors to:
determine a first set of tracking loop parameters based at least in part on a first reference signal received from a first transmit receive point (TRP) and a second set of tracking loop parameters based at least in part on a second reference signal received from a second TRP;
determine a common tracking loop parameter based at least in part on combining the first set of tracking loop parameters and the second set of tracking loop parameters; and
perform a tracking loop operation using the common tracking loop parameter, wherein the tracking loop operation comprises at least one of a frequency tracking loop operation or a time tracking loop operation,
wherein, when the UE is configured with a transmission configuration indicator that can change dynamically, and when a scheduling offset between a control channel and a corresponding data channel satisfies a threshold, the tracking loop operation is performed in accordance with a default transmission configuration indicator or a combination of active transmission configuration indicator states.

22. The non-transitory computer-readable medium of claim 21, wherein the one or more instructions, when executed by the one or more processors, further cause the one or more processors to:
determine a first error value for the first TRP and a second error value for the second TRP,
wherein the first error value and the second error value identify frequency or time errors of the first TRP and the second TRP, respectively, relative to the common tracking loop parameter; and
perform channel estimation for the first TRP and the second TRP using the first error value and the second error value, respectively.

23. The non-transitory computer-readable medium of claim 21, wherein the one or more instructions, when executed by the one or more processors, further cause the one or more processors to:
receive at least a first part of a data channel from the first TRP and at least a second part of the data channel from the second TRP; and
process the data channel using the common tracking loop parameter.

24. An apparatus for wireless communication, comprising:
means for determining a first set of tracking loop parameters based at least in part on a first reference signal received from a first transmit receive point (TRP) and a second set of tracking loop parameters based at least in part on a second reference signal received from a second TRP;
means for determining a common tracking loop parameter based at least in part on combining the first set of tracking loop parameters and the second set of tracking loop parameters; and
means for performing a tracking loop operation using the common tracking loop parameter, wherein the tracking loop operation comprises at least one of a frequency tracking loop operation or a time tracking loop operation,
wherein, when the apparatus is configured with a transmission configuration indicator that can change dynamically, and when a scheduling offset between a control channel and a corresponding data channel satisfies a threshold, the tracking loop operation is performed in accordance with a default transmission configuration indicator or a combination of active transmission configuration indicator states.

25. The apparatus of claim 24, further comprising:
means for determining a first error value for the first TRP and a second error value for the second TRP,
wherein the first error value and the second error value identify frequency or time errors of the first TRP and the second TRP, respectively, relative to the common tracking loop parameter; and
means for performing channel estimation for the first TRP and the second TRP using the first error value and the second error value, respectively.

26. The apparatus of claim 24, further comprising:
means for receiving at least a first part of a data channel from the first TRP and at least a second part of the data channel from the second TRP; and
means for processing the data channel using the common tracking loop parameter.

27. The apparatus of claim 24, further comprising:
means for receiving a first data channel from the first TRP and a second data channel from the second TRP, wherein the first data channel is different from the second data channel; and
means for processing the first data channel and the second data channel using the common tracking loop parameter.

28. The apparatus of claim 24, wherein the first TRP is associated with a first quasi-collocation relationship, and wherein the second TRP is associated with a second quasi-collocation relationship.

* * * * *